US012577092B2

(12) United States Patent
Graham et al.

(10) Patent No.: US 12,577,092 B2
(45) Date of Patent: Mar. 17, 2026

(54) ELECTRICAL INSULATION LINER FOR AERIAL LIFT PLATFORM DOOR

(71) Applicant: Altec Industries, Inc., Saint Joseph, MO (US)

(72) Inventors: Austin Graham, Kansas City, MO (US); Aaron Servais, Gower, MO (US)

(73) Assignee: Altec Industries, Inc., Birmingham, AL (US)

( * ) Notice: Subject to any disclaimer, the term of this patent is extended or adjusted under 35 U.S.C. 154(b) by 710 days.

(21) Appl. No.: 17/959,770

(22) Filed: Oct. 4, 2022

(65) Prior Publication Data

US 2024/0109761 A1 Apr. 4, 2024

(51) Int. Cl.
*B66F 17/00* (2006.01)
*H01B 3/44* (2006.01)

(52) U.S. Cl.
CPC ............ *B66F 17/006* (2013.01); *H01B 3/441* (2013.01)

(58) Field of Classification Search
CPC ...... B66F 11/046; B66F 11/04; B66F 9/0759; B66F 17/006
USPC .................................................... 182/222, 46
See application file for complete search history.

(56) References Cited

U.S. PATENT DOCUMENTS

| | | | | | |
|---|---|---|---|---|---|
| 3,159,240 | A | | 12/1964 | Miller, Jr. | |
| 3,295,633 | A | | 1/1967 | Milner, Jr. | |
| 3,320,524 | A | | 5/1967 | Miller, Jr. | |
| 3,414,079 | A | * | 12/1968 | Wacht | B66F 11/044 182/222 |
| 3,489,243 | A | | 1/1970 | Stilwell et al. | |
| 3,625,305 | A | * | 12/1971 | Mueller | B66F 11/044 182/2.4 |
| 3,642,096 | A | * | 2/1972 | Valentine | B66F 11/044 182/2.11 |
| 3,800,912 | A | | 4/1974 | Ashworth | |
| 4,254,846 | A | | 3/1981 | Soave | |
| 4,623,290 | A | | 11/1986 | Kikuzawa et al. | |
| 4,681,497 | A | | 7/1987 | Berecz | |
| 4,717,302 | A | | 1/1988 | Adams et al. | |
| 4,763,755 | A | * | 8/1988 | Murray | B66F 11/044 182/2.2 |
| 4,909,690 | A | | 3/1990 | Gapp et al. | |

(Continued)

FOREIGN PATENT DOCUMENTS

| | | | |
|---|---|---|---|
| AU | 2009201178 | A1 | 10/2009 |
| CA | 2030202 | A1 | 5/1992 |

(Continued)

OTHER PUBLICATIONS

U.S. Appl. No. 18/664,965 Non-Final Office Action issued Aug. 26, 2024.

*Primary Examiner* — Paola Agudelo
(74) *Attorney, Agent, or Firm* — Erise IP, P.A.

(57) ABSTRACT

An aerial lift platform includes a door having one or more insulating liner layers. The door of the aerial lift platform is tightly bonded to a rim of an opening of an aerial lift platform by at least one nonconductive fastener, such that the one or more insulating liner layers of the door are tightly bonded to at least one insulting liner of the aerial lift platform, such that a complete insulating liner is formed around both the aerial lift platform and the door. The one or more insulating liner layers of the door are able to be connected to one or more attachments via one or more nonconductive fasteners.

18 Claims, 7 Drawing Sheets

(56) References Cited

U.S. PATENT DOCUMENTS

| | | | |
|---|---|---|---|
| 5,098,240 | A | 3/1992 | Gapp et al. |
| 5,431,518 | A | 7/1995 | Young et al. |
| 5,942,974 | A | 8/1999 | Pfreundschuh et al. |
| 6,265,983 | B1 | 7/2001 | Baillargeon |
| 6,519,131 | B1 | 2/2003 | Beck |
| 6,739,813 | B1 | 5/2004 | Gundy et al. |
| 7,748,496 | B2 | 7/2010 | Higgins et al. |
| 7,806,231 | B1 | 10/2010 | Jackson |
| 7,866,730 | B2 | 1/2011 | Lewis et al. |
| 7,918,634 | B2 | 4/2011 | Conrad et al. |
| 8,550,211 | B2 | 10/2013 | Higgins et al. |
| 8,550,212 | B2 | 10/2013 | Higgins et al. |
| 8,708,177 | B2 | 4/2014 | Roberts |
| 8,899,380 | B2 | 12/2014 | Chard |
| 9,573,797 | B1 | 2/2017 | Beck |
| 9,683,379 | B2 | 6/2017 | Christian et al. |
| 9,776,845 | B2 | 10/2017 | Minke |
| 9,851,048 | B2 | 12/2017 | Higgins |
| 10,112,656 | B2 | 10/2018 | McKinney et al. |
| 10,138,102 | B2 | 11/2018 | Baillargeon et al. |
| 10,338,107 | B1 | 7/2019 | Beck |
| 10,815,107 | B2 | 10/2020 | Li et al. |
| 10,822,216 | B2 | 11/2020 | McKinney et al. |
| 10,974,939 | B2 | 4/2021 | Bilic et al. |
| 11,104,563 | B1 | 8/2021 | Deters |
| 11,208,156 | B2 | 12/2021 | McKinney et al. |
| 11,305,478 | B2 | 4/2022 | McKinney et al. |
| 11,306,867 | B2 | 4/2022 | McKinney et al. |
| 11,307,001 | B2 | 4/2022 | Lynch et al. |
| 11,822,356 | B1 | 11/2023 | Beck et al. |
| 11,926,366 | B2 | 3/2024 | McKinney et al. |
| 11,958,728 | B2 | 4/2024 | Wabnegger et al. |
| 2003/0213644 | A1 | 11/2003 | Chard et al. |
| 2005/0045355 | A1 | 3/2005 | Dubail et al. |
| 2012/0063866 | A1 | 3/2012 | Jeong et al. |
| 2012/0241250 | A1 | 9/2012 | Eakin et al. |
| 2013/0048425 | A1 | 2/2013 | Thompson |
| 2013/0256024 | A1* | 10/2013 | Roberts ................. B29C 44/445 174/5 SB |
| 2013/0306404 | A1 | 11/2013 | Higgins et al. |
| 2014/0138183 | A1 | 5/2014 | Chard |
| 2015/0027808 | A1* | 1/2015 | Baillargeon ....... A62B 35/0025 182/19 |
| 2016/0017615 | A1 | 1/2016 | Christian et al. |
| 2016/0280525 | A1* | 9/2016 | Higgins ................. F16M 13/02 |
| 2016/0368738 | A1 | 12/2016 | Minke |
| 2017/0334698 | A1 | 11/2017 | Beck |
| 2017/0369296 | A1 | 12/2017 | McKinney et al. |
| 2018/0126627 | A1* | 5/2018 | McKinney .......... B29C 48/0017 |
| 2018/0370781 | A1 | 12/2018 | Phillips et al. |
| 2019/0023330 | A1* | 1/2019 | McKinney ............. B62D 33/02 |
| 2019/0100253 | A1 | 4/2019 | McKinney et al. |
| 2019/0112172 | A1 | 4/2019 | Wabnegger et al. |
| 2019/0135603 | A1 | 5/2019 | Bilic et al. |
| 2019/0136836 | A1 | 5/2019 | Sanderson |
| 2019/0210852 | A1 | 7/2019 | Fritel et al. |
| 2019/0359462 | A1 | 11/2019 | Mueller |
| 2020/0039805 | A1 | 2/2020 | Li et al. |
| 2020/0109039 | A1 | 4/2020 | Phillips et al. |
| 2021/0048143 | A1 | 2/2021 | McKinney et al. |
| 2021/0048277 | A1 | 2/2021 | Lynch et al. |
| 2021/0381376 | A1 | 12/2021 | Locotos et al. |
| 2022/0111912 | A1 | 4/2022 | McKinney et al. |
| 2022/0234275 | A1 | 7/2022 | McKinney et al. |
| 2023/0183991 | A1 | 6/2023 | Peterson |
| 2023/0366190 | A1 | 11/2023 | Schuster |
| 2023/0366621 | A1 | 11/2023 | O'Connell et al. |
| 2024/0109761 | A1 | 4/2024 | Graham et al. |

FOREIGN PATENT DOCUMENTS

| | | | |
|---|---|---|---|
| CA | 2707694 | A1 | 8/2006 |
| CN | 107840284 | A | 3/2018 |
| CN | 112265944 | A | 1/2021 |
| CN | 112811366 | A | 5/2021 |
| CN | 221397224 | U | 7/2024 |
| GB | 2493381 | A | 2/2013 |
| GB | 2532775 | A | 6/2016 |
| KR | 20140133246 | A | 11/2014 |
| KR | 20180086809 | A | 8/2018 |
| KR | 102529827 | B1 | 5/2023 |
| KR | 20230144787 | A | 10/2023 |
| WO | 2012071032 | A1 | 5/2012 |

* cited by examiner

ELECTRICAL INSULATION LINER FOR AERIAL LIFT PLATFORM DOOR

BACKGROUND OF THE INVENTION

1. Field of the Invention

The present invention relates to components for aerial lift platforms, and more specifically to systems for electrical insulation of aerial lift platform doors.

2. Description of the Prior Art

It is generally known in the prior art to provide electrically insulated aerial lift platforms.

Prior art patent documents include the following:

U.S. Pat. No. 11,305,478 for Door assembly for use on a utility truck by inventors McKinney et al., filed Nov. 3, 2017 and issued Apr. 19, 2022, discloses a multi-sheet component for a utility vehicle that includes at least one gap between at least two of the sheets, thereby providing a component that enhances worker safety by increasing component stiffness and reducing component thickness. The component is manufactured through multi-sheet thermoforming and uses a conical frustum corrugation to increase stiffness.

U.S. Pat. No. 11,104,563 for Flexible conductive platform liner by inventor Deters, filed Nov. 6, 2020 and issued Aug. 31, 2021, discloses a flexible and electrically conductive platform liner for lining an aerial work platform. The platform liner is composed of a flexible and electrically conductive material, such that it is foldable for transport and storage. The platform liner is configured to be placed into the aerial work platform and electrically bonded to an energized power line during operation, such that the platform liner is held at a similar electrical potential to the energized power line.

U.S. Pat. No. 7,748,496 for Aerial work platform assembly using composite materials by inventors Higgins et al., filed Feb. 10, 2005 and issued Jul. 6, 2010, discloses an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

U.S. Pat. No. 8,550,212 for Aerial work assembly using composite materials by inventors Higgins et al., filed Apr. 16, 2010 and issued Oct. 8, 2013, discloses an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

US Patent Publication No. 2012/0241250 for Aerial Work Platforms and Aerial Work Platform Assemblies Comprised of Polymerized Cycloolefin Monomers by inventors Eakin et al., filed Mar. 26, 2012 and published Sep. 27, 2012, discloses an aerial work platform assembly including: a) a platform shaft retaining assembly; b) a mounting bracket connected to the platform shaft retaining assembly; and c) a platform connected to the mounting bracket. The platform shaft retaining assembly includes two concentric apertures for installation of a pivot shaft therein; the mounting bracket having an upper gusset member and a center gusset member that are bonded together and that include horizontal portions to which the pivot shaft is bonded; upper and lower platform pins; a valve bracket; a platform bracket; and upper platform pins that provide for pivoting on a lower platform pin and tilting down of the platform thereby. At least one of the platform shaft retaining assembly, the mounting bracket, the platform, the upper and lower platform pins, and the valve bracket are molded from at least one monomer having at least one norbornene functionality, such as polydicyclopentadiene.

US Patent Publication No. 2013/0048425 for Dielectric coating and application process by inventor Thompson, filed Aug. 30, 2012 and published Feb. 28, 2013, discloses a method of electrically insulating one or more components of a boom assembly involving applying a seamless coating of dielectric material to an outer surface of each of one or more boom assembly components, the boom assembly components being constructed of metal or other electrically conductive material. The dielectric material is applied as a liquid and, when hardened, creates a seamless, electrically insulating barrier on the boom assembly components to which it is applied. A layer of ultraviolet radiation protective material may be applied on top of the layer of dielectric material to protect the dielectric material from ultraviolet degradation. The boom assembly components may be painted or otherwise treated prior to the application of the dielectric material.

U.S. Pat. No. 10,822,216 for Modular rib for elevating platform by inventors McKinney et al., filed Aug. 25, 2017 and issued Nov. 3, 2020, discloses a mounting rib for an elevating platform, the rib designed and configured to insert through a slot in the sidewall of the elevating platform. The rib is composed of a T-shaped and two L-shaped components, wherein the T-shaped component inserts through the slot and the L-shaped components are attached on the exterior of the platform. Also, a corner-mounted rib for an elevating platform.

U.S. Pat. No. 9,851,048 for Liner retention system for an aerial device by inventor Higgins, filed Mar. 27, 2015 and issued Dec. 26, 2017, discloses a utility platform assembly a having a utility platform, an insulative liner, and a liner retention system. The insulative liner presents a complementary shape to, and is disposed in, the utility platform. The insulative liner is secured in place and protected from damage by the liner retention system. The liner retention system is disposed atop and through the liner near the top edge or edges of the insulative liner. The edge or edges of the insulative liner are therefore disposed between the liner retention system and the lip of the sidewall of the utility platform. The liner retention system generally comprises at least one retaining bar with an associated plurality of fastener receptors and fasteners.

U.S. Pat. No. 7,866,730 for Thermoformed twinsheet molded vehicle door system by inventors Lewis et al., filed Nov. 14, 2008 and issued Jan. 11, 2011, discloses a twinsheet door which includes a first door portion and a second door portion connected to the first door portion. The twinsheet door of the present invention is manufactured using a thermoforming process, during which a vacuum shapes the first door portion and the second door portion such that one or more closed sections are created when the first door portion is thermally bonded to the second door portion and simultaneously a vacuum is applied to form the first door portion and said second door portion. The closed section formed between the first door portion and second door portion provides additional strength and rigidity to the twinsheet door. Additionally, the forming of the closed section between the first door portion and the second door portion and the bonding between the first door portion and second door portion is achieved during a single manufacturing process.

U.S. Pat. No. 11,306,867 for Mounting system for elevating platform by inventors McKinney et al., filed Oct. 29, 2020 and issued Apr. 19, 2022, discloses mounting plates for elevating platforms, including a mounting apparatus with interior and exterior reinforcement components elongated vertically. The interior reinforcement piece includes an embedded bolt that extends from the interior reinforcement piece, through a wall of the platform, and through the exterior reinforcement component. The interior and exterior reinforcement components have a stepped construction to convert peel stress to shear stress.

U.S. Pat. No. 10,112,656 for Truck body assembly and methods of making and using same by inventors McKinney et al., filed Feb. 24, 2017 and issued Oct. 30, 2018, discloses an assembly for utility truck bodies having metal and/or composite reinforcement(s) and/or foam reinforcements and/or honeycomb reinforcement/and/or wood reinforcements encapsulated within a thermoformed thermoplastic, or thermoset or fiber-reinforced thermoset walking surface floor structure of the truck bed assembly or other composite floor structure with attachable components and junctions, e.g., sidepack(s), and methods of making the same are provided.

US Patent Publication No. 2022/0111912 for Sidepack floor and methods of making and using same by inventors McKinney et al., filed Dec. 21, 2021 and published Apr. 14, 2022, discloses an assembly for utility truck bodies having metal and/or composite reinforcement(s) and/or foam reinforcements and/or honeycomb reinforcement/and/or wood reinforcements encapsulated within a thermoformed thermoplastic, or thermoset or fiber-reinforced thermoset walking surface floor structure of the truck bed assembly or other composite floor structure with attachable components and junctions, e.g., sidepack(s), and methods of making the same are provided.

SUMMARY OF THE INVENTION

The present invention relates to components for aerial lift platforms, and more specifically to systems for electrical insulation of aerial lift platform doors.

It is an object of this invention to provide an aerial life platform having a door and optionally including a step or other attachments, wherein the door and the step or other attachments are electrically insulated via contact of insulating liners of the door and of the aerial lift platform.

In one embodiment, the present invention is directed to a door for an aerial lift platform, including at least one insulating liner covering an exterior surface of the door, at least one gap adjacent to the at least one insulating liner, wherein the door is configured to fit into an opening in a side wall of the aerial lift platform, and wherein the door is configured to attach to at least one insulating layer of the aerial lift platform via at least one nonconductive fastener or other attachment means.

In another embodiment, the present invention is directed to a door for an aerial lift platform, including a first insulating liner layer covering an exterior surface of the door, a second insulating liner layer covering an interior surface of the door, at least one step and/or at least one tooling tray attached to and extending from an interior surface of the door, wherein the door is configured to fit into an opening in a side wall of the aerial lift platform, and wherein the door is configured to attach to at least one insulating layer of the aerial lift platform via at least one nonconductive fastener or other attachment means.

In yet another embodiment, the present invention is directed to a door for an aerial lift platform, including a first insulating liner layer covering an exterior surface of the door, a second insulating liner layer covering an interior surface of the door, wherein the door is configured to fit into an opening in a side wall of the aerial lift platform, wherein an overlap of the at least one insulating layer of the aerial lift platform extends into the opening in the side wall of the aerial lift platform, and wherein, when the door is in a closed position, an interior liner of the door directly contacts the overlap of the at least one insulating layer, and wherein the door is configured to attach to at least one insulating layer of the aerial lift platform via at least one nonconductive fastener or other attachment means.

These and other aspects of the present invention will become apparent to those skilled in the art after a reading of the following description of the preferred embodiment when considered with the drawings, as they support the claimed invention.

DETAILED DESCRIPTION

Figure 1:
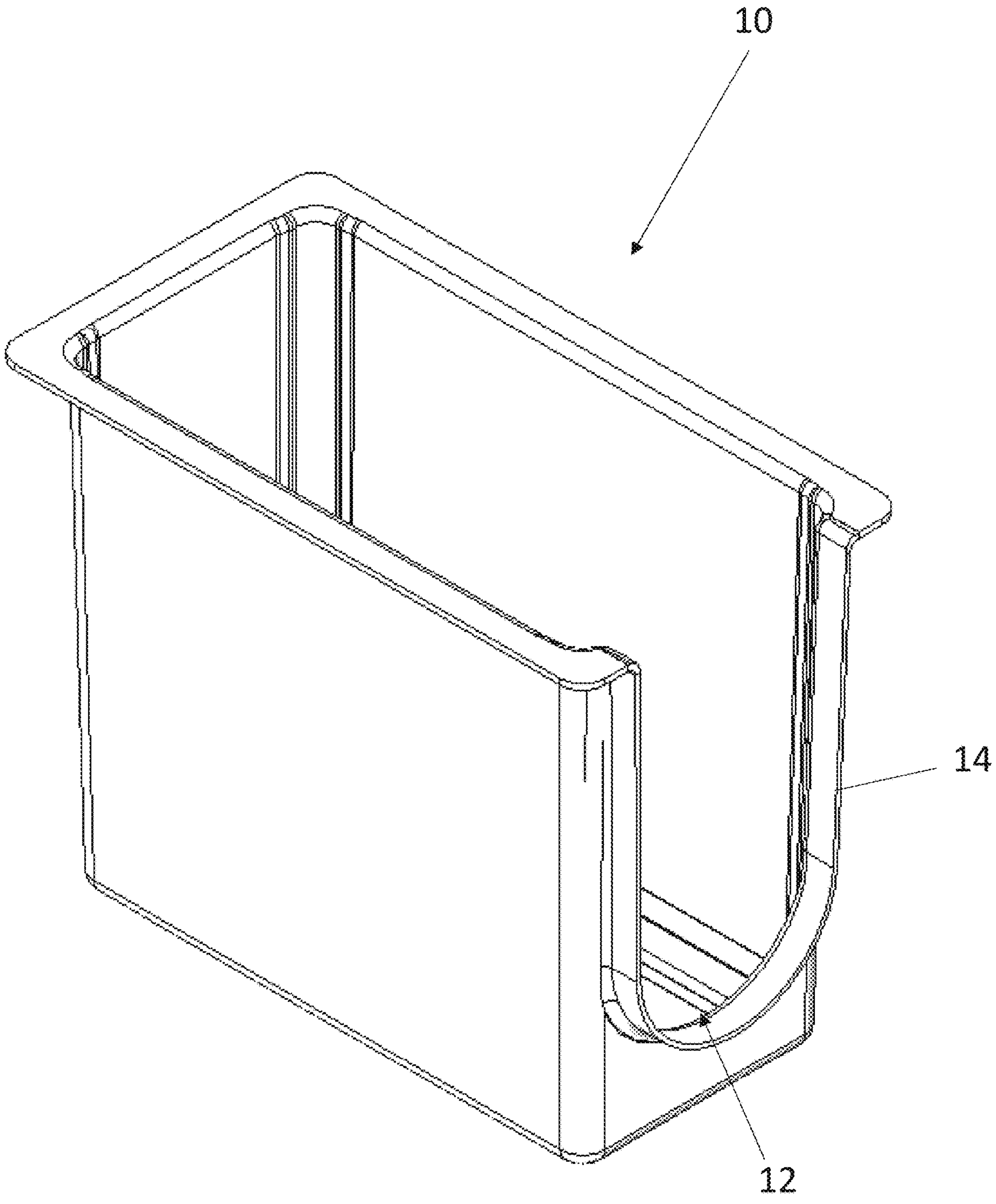
FIG. 1 illustrates a perspective view of an aerial lift platform without a door according to one embodiment of the present invention.

The present invention is generally directed to components for aerial lift platforms, and more specifically to systems for electrical insulation of aerial lift platform doors.

In one embodiment, the present invention is directed to a door for an aerial lift platform, including at least one insulating liner covering an exterior surface of the door, at least one air gap between the at least one insulating liner and the exterior surface of the door, wherein the door is configured to fit into an opening in a side wall of the aerial lift platform, and wherein the door is configured to attach to at least one insulating layer of the aerial lift platform via at least one nonconductive fastener or other attachment means.

In another embodiment, the present invention is directed to a door for an aerial lift platform, including a first insulating liner layer covering an exterior surface of the door, a second insulating liner layer covering an interior surface of the door, at least one step and/or at least one tooling tray attached to and extending from an interior surface of the door, wherein the door is configured to fit into an opening in a side wall of the aerial lift platform, and wherein the door is configured to attach to at least one insulating layer of the aerial lift platform via at least one nonconductive fastener or other attachment means.

In yet another embodiment, the present invention is directed to a door for an aerial lift platform, including a first insulating liner layer covering an exterior surface of the door, a second insulating liner layer covering an interior surface of the door, wherein the door is configured to fit into an opening in a side wall of the aerial lift platform, wherein an overlap of the at least one insulating layer of the aerial lift platform extends into the opening in the side wall of the aerial lift platform, and wherein, when the door is in a closed position, an interior liner of the door directly contacts the overlap of the at least one insulating layer, and wherein the door is configured to attach to at least one insulating layer of the aerial lift platform via at least one nonconductive fastener or other attachment means.

Aerial lift platforms are common devices used in the industry by power line repairmen (and other workers). Aerial lift platforms are commonly attached to a boom (e.g., a telescoping lift boom), which itself is attached to a service vehicle. Working on power lines creates strong risks for electrocution. Because of this, platforms commonly need to be formed from an insulating material or include an insulating liner to electrically isolate any workers in the aerial lift platform from sources of electric outside of the platform, including those that directly contact the exterior of the aerial lift platform.

The need for electrical isolation also makes adding doors to aerial lift platforms particularly challenging. For this reason, aerial lift platforms typically lack doors entirely, instead having openings in the side through which workers enter the platform, or steps integrally formed with the exterior of the platform that workers step on to enter the platform. For example, the splicer door described in U.S. Pat. No. 11,305,478, which is incorporated herein by reference in its entirety, describes the use of recessed mounting locations, recessed handles, and a covered striker pin to reduce contact points that pose a potential risk of electrocution. However, the splicer door used standoffs to attempt to isolate the door from the platform as a whole, and did not include an integrated electrical liner that isolated both the platform and the door. Therefore, what is needed is a platform having an improved, electrically isolated door.

Referring now to the drawings in general, the illustrations are for the purpose of describing one or more preferred embodiments of the invention and are not intended to limit the invention thereto.

The purpose of the present invention is to provide an electrically insulated door for an aerial lift platform. The electrically insulated door includes at least one interior insulating liner (e.g., nonconductive polyethylene liner) which is tightly bonded to an insulating liner of an aerial lift platform at a liner via nonconductive fasteners. Because the insulating liner of the aerial lift platform and the door is tightly connected at least at the hinge of the door, the two insulating liners essentially form one continuous insulting liner when the door is closed. The aerial lift platform and door are designed to insulate voltages of at least 50 kV.

In one embodiment, the door of the present invention is designed for an aerial lift platform having a length of approximately 26 inches and a width of approximately 26 inches. However, one of ordinary skill in the art will understand that the door is capable of being used with aerial lift platforms having any variety of dimensions.

FIG. 1 illustrates a perspective view of an aerial lift platform without a door according to one embodiment of the present invention. The aerial lift platform includes side walls and a base and is open to a top side opposite of the base. An aerial lift platform 10 includes an opening 12 in a sidewall of the platform 10. The opening 12 is configured to allow a worker to enter and exit the aerial lift platform 10. A lip 14 surrounds the opening 12 and the top side of the base, and extends orthogonally outwardly from the side wall of the aerial lift platform. An inner liner layer surrounds and covers interior surfaces of the sidewalls and/or base of the aerial lift platform 10. The inner liner layer is formed from an insulating dielectric material, such as polyethylene, polystyrene, fiberglass, and/or other insulating materials.

Figure 2:
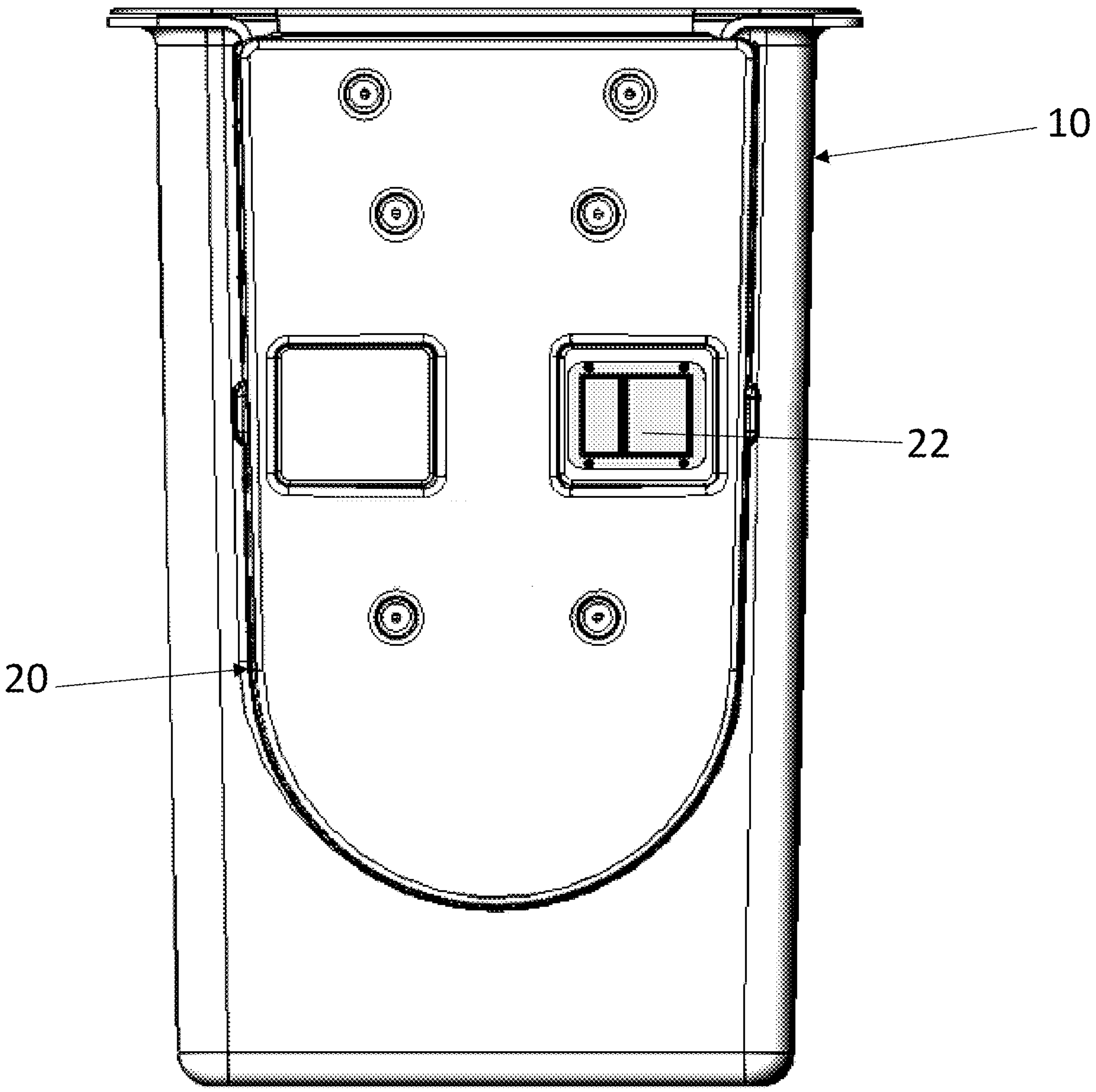
FIG. 2 illustrates a front view of an aerial lift platform with door included according to one embodiment of the present invention.
Figure 3:
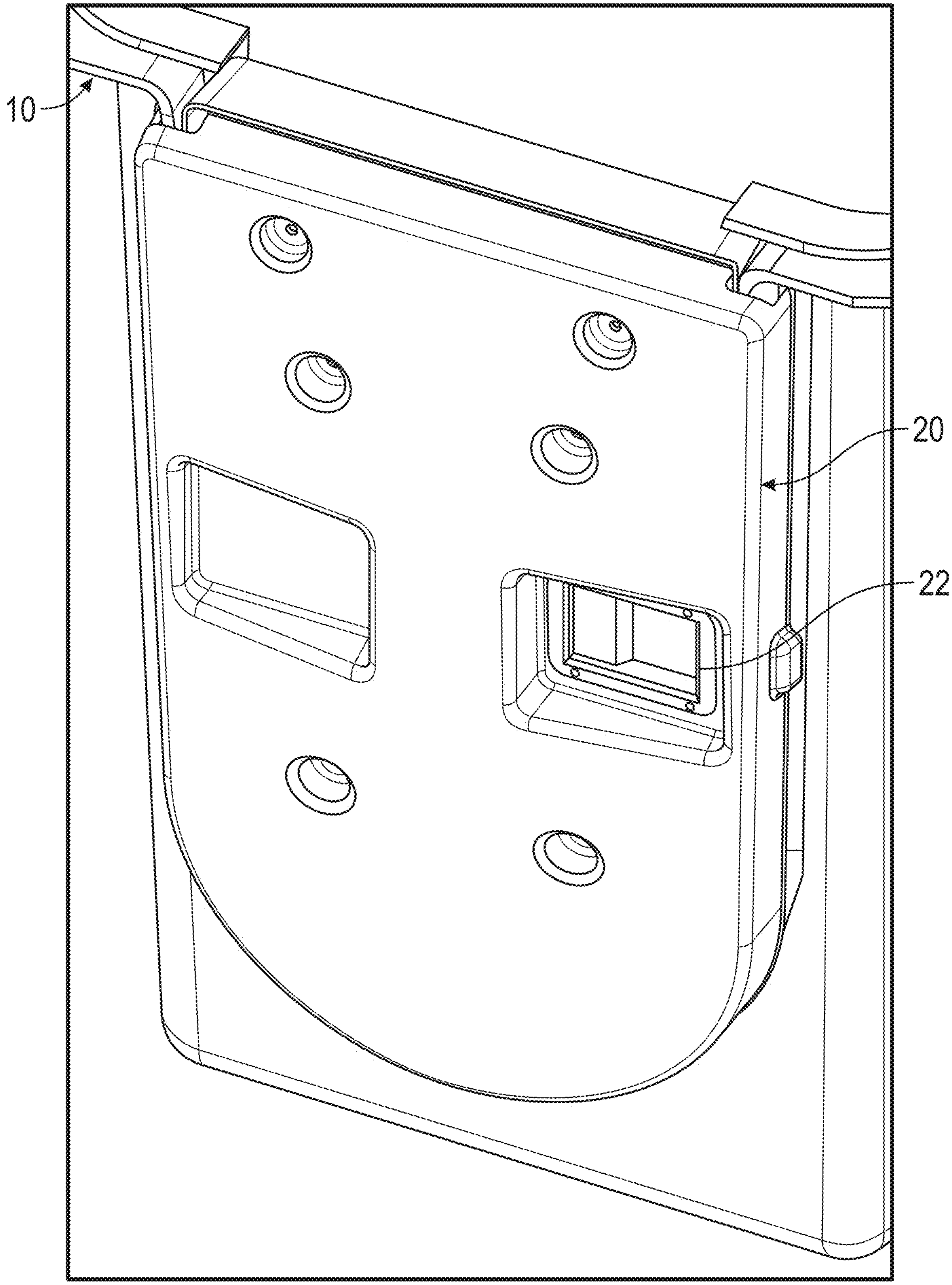
FIG. 3 illustrates a front perspective view of an aerial lift platform with door included according to one embodiment of the present invention.

FIGS. 2-3 illustrate an aerial lift platform with door included according to one embodiment of the present invention. According to the present invention, a door 20 is configured to fit into and cover the opening of the aerial lift platform 10. In one embodiment, the door 20 is hingedly attached to one side of the lip surrounding the opening and is latched to an opposite side of the opening when in a closed position. In one embodiment, the door 20 includes a handle 22 that, when pulled, releases the latch, thereby allowing the door to hingedly open outwardly from the aerial lift platform 10. In one embodiment, the door 20 is recessed within the aerial lift platform 10.

Figure 4:
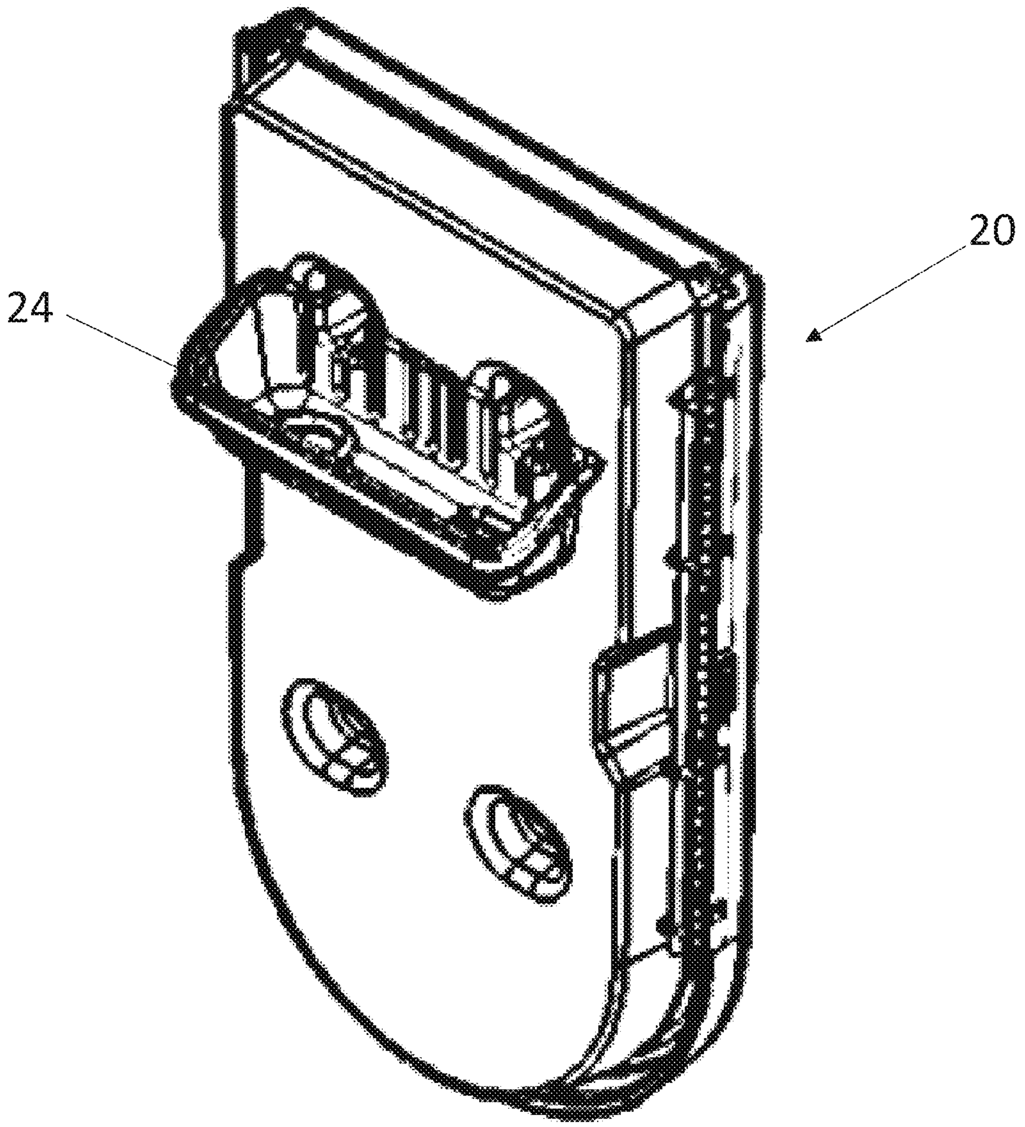
FIG. 4 illustrates a back perspective view of a door for an aerial lift platform including a step according to one embodiment of the present invention.
Figure 5:
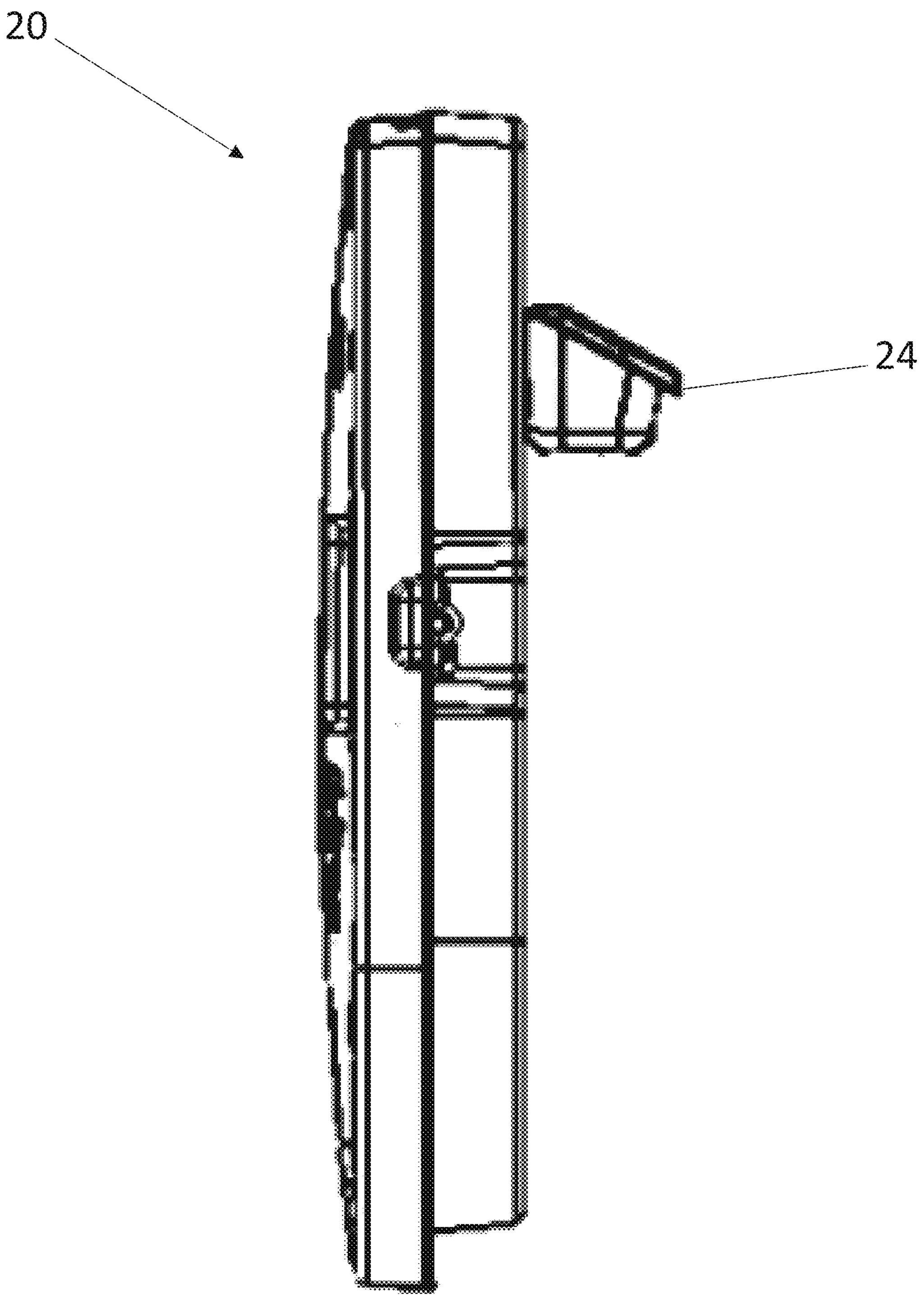
FIG. 5 illustrates a side view of a door for an aerial lift platform according to one embodiment of the present invention.

FIGS. 4-5 illustrates a door for an aerial lift platform including a step according to one embodiment of the present invention. In one embodiment, a tray 24 extends outwardly from the back of the door 20. When the door 20 is in a closed position, the tray 24 extends into the interior of the aerial lift platform, such that a worker is able to use the tray 24 to store materials to be used by the worker. In another embodiment, additional or alternative attachments extend outwardly from the back of the door 20 into the interior of the aerial lift platform, including, but not limited to, a step able to be used by a worker to step out of the aerial lift platform while the door 20 is closed. One of ordinary skill in the art will understand that the step, the tray, or any other attachments to the door 20 are optional features and that the present invention does not require the inclusion of any such attachments.

Figure 6:
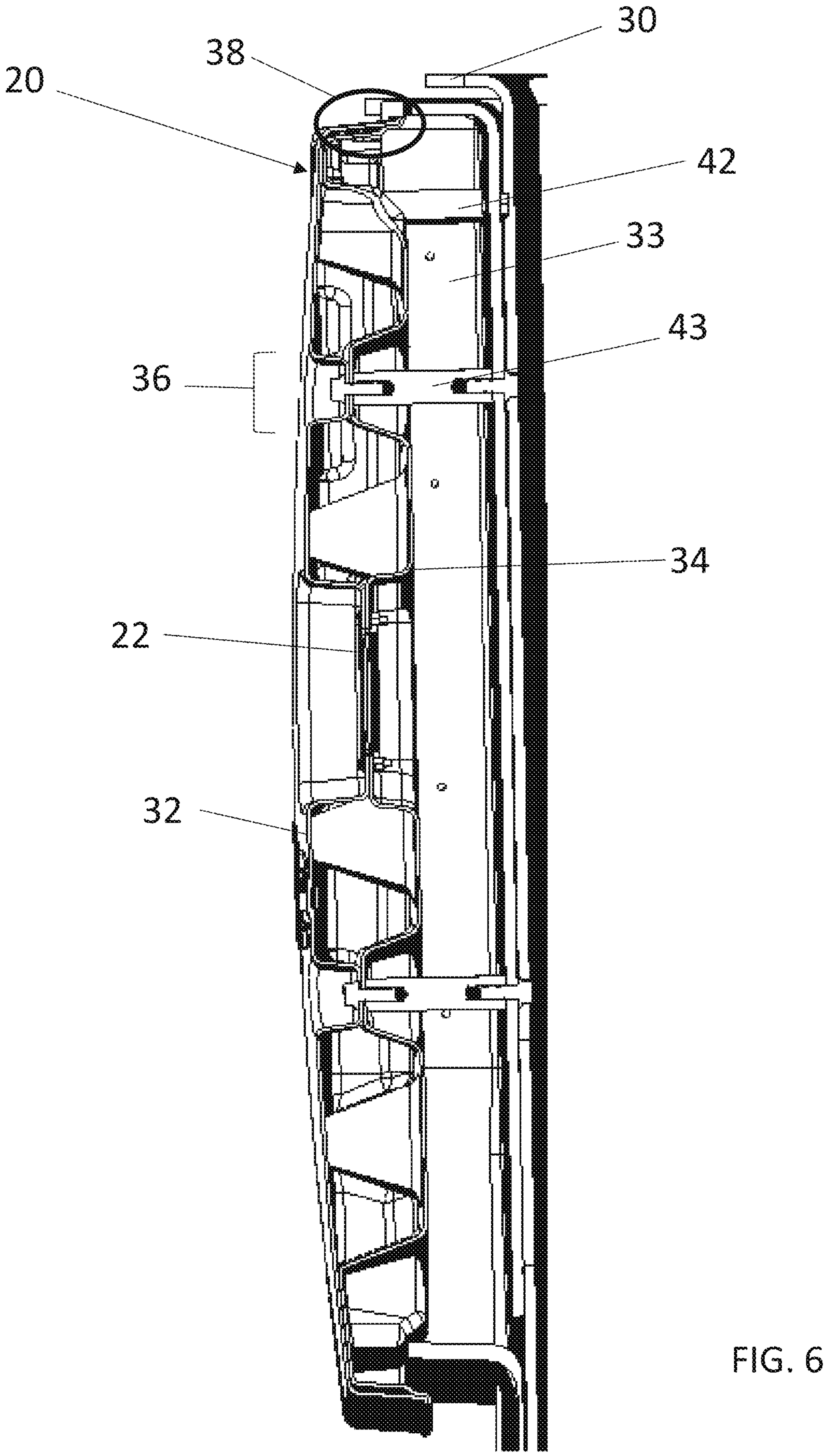
FIG. 6 illustrates a side sectional view of a hinge of a door connected to an aerial lift platform according to one embodiment of the present invention.

FIG. 6 illustrates a side sectional view of a hinge of a door connected to an aerial lift platform according to one embodiment of the present invention. FIG. 6 illustrates the connection point between the door 20 and the inner liner layer 30 of the aerial lift platform. The door includes a first insulation liner 32 exposed to an exterior (i.e., facing outside the aerial lift platform) surface of the door 20. The first insulation liner 32 forms an exterior surface of the door 20. As shown in FIG. 6, at locations where the exterior surface of the door 20 is recessed, such as the handle 22 and/or at liner connection points 36, the first insulation liner 32 includes corresponding indentations, represented by regions wherein the external surface of the first insulation liner 32 is nearer to the inner liner layer 30 of the aerial lift platform.

The door 20 further includes a second insulation liner 34. At areas of the door 20 that are not recessed, the first insulation liner 32 is separated from the second insulation liner 34 by a gap. In one embodiment, at areas of the door 20 that are not recessed, the second insulation liner 34 lines an air gap 33 of the door 20. The air gap 33 of the door 20 provides separation between the surfaces of the door 20 and the platform, and accounts for a large percentage of the thickness of the door 20. In one embodiment, at areas of the door 20 that are recessed, the second insulation liner 34 is positioned closer to the exterior of the door 20 than at those areas that are not recessed. In one embodiment, at areas of the door 20 that are recessed, the second insulation liner 34 is directly adjacent to the first insulation liner 32. In one embodiment, at the edges of the door 20, as shown with indicia 38, the second insulation liner 34 is tightly bonded to the first insulation liner 32.

In one embodiment, the air gap 33 is replaced with at least one bulk layer. In one embodiment, the at least one bulk layer includes a reinforced plastic material (e.g., carbon fiber reinforced plastic), unreinforced plastic material, foam, honeycomb materials, and/or other materials. Preferably, the at least one bulk layer is formed from an insulating, and not a conductive, material.

In one embodiment, at one or more recessed areas where the first insulation liner 32 and the second insulation liner 34 meet, at least one nonconductive fastener 42 extends through both the first insulation liner 32 and the second insulation liner 34, through the air gap 33, and connects to the inner liner layer 30 of the aerial lift platform. Therefore, the at least one nonconductive fastener 42 binds the door 20 to the aerial lift platform. Because the fasteners 42 is nonconductive, they do not carry the risk of electrifying the inside (or outside) of the aerial lift problem in the event that an electrified line or another source of charge comes into contact with the recessed exterior head of the fastener 42. In one embodiment, the nonconductive fastener 42 is an ISOPLAST (i.e., fiberglass-reinforced rigid thermoplastic polyurethane) bolt. In another embodiment, the nonconductive fastener 42 is formed from polycarbonate, polyethylene, polypropylene, and/or at least one fiber-reinforced thermosetting polymer. In one embodiment, the nonconductive fastener 42 includes a leveling rod that serves as a standoff between the exterior surface of the door 20 and the interior surface of the door 20. In one embodiment, the leveling rod is attached to the exterior surface of the door 20 by a nonconductive bolt and is attached to the interior surface of the door 20 by a nonconductive bolt. In one embodiment, the leveling rod comprises high density polyethylene (HDPE). In one embodiment, the leveling rod has an outer diameter of approximately one inch. In one embodiment, the door 20 is not connected to the aerial lift platform by one or more nonconductive fasteners 42 and is instead connected via other means, including, but not limited to, thermal bonding between the door 20 and the aerial lift platform. In addition to the nonconductive fasteners 42, in one embodiment, one or more standoffs 43 separate the second insulation liner 34 from the inner insulation layer 30 of the aerial lift platform, spanning the thickness of the air gap 33.

Figure 7:
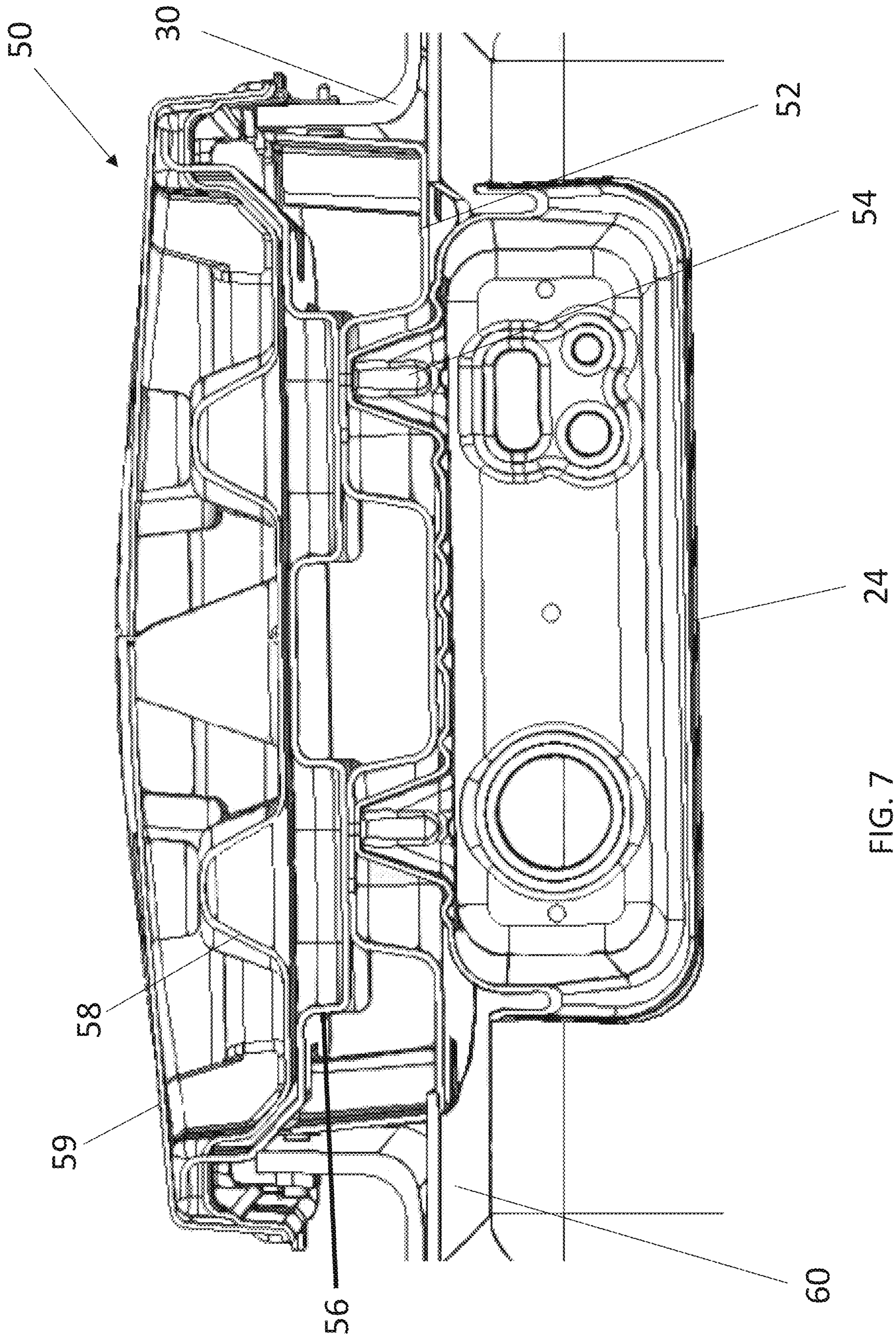
FIG. 7 illustrates a top sectional view of a door connected to an aerial platform according to one embodiment of the present invention.

FIG. 7 illustrates a top sectional view of a door connected to an aerial platform according to one embodiment of the present invention. The door 50 includes a first outer liner layer 59 forming an exterior surface of the door 50. A second liner layer 58 is positioned on an interior side of the first outer liner layer 59 and is separated by a gap from the first outer liner layer 59 (with the exception of at the edges of the door 50, where each liner layer is pinched together) by a gap. In one embodiment, the second liner layer 58 includes one or more corrugations extending toward an external side (i.e., toward the first outer liner layer 59) of the second line layer 58. In one embodiment, the door includes a third liner layer 56. In one embodiment, the third liner layer 56 is flush with the second liner layer 58 and is positioned on an interior side of the second liner layer 58. In one embodiment, the third liner layer 56 includes one or more corrugations and the corrugations are directed toward an interior side of the door 50, such that a gap is formed between the second liner layer 58 and the third liner layer 56 at the locations of the corrugations. Finally, the door 50 includes a fourth inner liner layer 52, which forms an internal surface of the door 50. In one embodiment, the fourth inner liner layer 52 includes one or more indentations. In one embodiment, the fourth inner liner layer 52 directly contacts the third liner layer 56 at the one or more indentations and is separated from the third liner layer 56 by a gap at other positions. In one embodiment, the door 50 is attached to a tooling tray 24, a step or another attachment via at least one nonconductive fastener 54 at the one or more indentations of the fourth inner liner layer 52.

In one embodiment, each of the first outer liner layer 59, the second liner layer 58, the third liner layer 56, and the fourth inner liner layer 52 are formed from nonconductive materials, such as polyethylene, thermoplastic olefin (TPO), polycarbonate, polypropylene, acrylonitrile butadiene styrene (ABS), polyethylene, and/or any other plastic, preferably including plastic operable to undergo multi-sheet thermoforming. Preferably, the materials used for the liner door assembly are dielectric and provide high impact resistance and corrosion resistance. In one embodiment, the door 50 does not include the third liner layer 56, and instead only three total liner layers are used. In one embodiment, an inner insulation liner 60 of the aerial lift platform extends slightly into the opening in the side of the aerial lift platform, such as that the inner insulation liner 60 overlaps with and contacts the door 50 when the door 50 is in a closed position. In one embodiment, the overlap is by approximately 0.5 inches. In one embodiment, the door 50 has a total thickness of approximately 5.7 inches.

In one embodiment, two or more of the first outer liner layer 59, the second liner layer 58, the third liner layer 56, and/or the fourth inner liner layer 52 are thermally bonded in order to keep components of the door 50 together. In another embodiment, the inner insulation liner 60 of the aerial lift platform is thermally bonded to at least one of the first outer liner layer 59, the second liner layer 58, the third liner layer 56, and/or the fourth inner liner layer 52.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A door for an aerial lift platform, comprising:

at least one insulating body covering an exterior surface of the door;

at least one air gap between the at least one insulating body and the aerial lift platform;

wherein the door is configured to fit into an opening in a side wall of the aerial lift platform; and wherein the door is configured to attach to at least one insulating layer of the aerial lift platform via at least one fastener wherein an overlap of the at least one insulating layer of the aerial lift platform extends into the opening in the side wall of the aerial lift platform, and wherein, when the door is in a closed position, an interior body of the door directly contacts the overlap of the at least one insulating layer.

2. The door of claim 1, wherein at least one step and/or at least one tooling tray is attached to and extends from an interior surface of the door.

3. The door of claim 2, wherein the at least one step and/or the at least one tooling tray is attached to the interior surface of the door via at least one attachment fastener.

4. The door of claim 1, wherein the at least one fastener comprises fiberglass-reinforced thermoplastic polyurethane, polycarbonate, polyethylene, polypropylene, and/or at least one fiber-reinforced thermosetting polymer.

5. The door of claim 1, the at least one insulating body comprises polyethylene, thermoplastic olefin (TPO), polycarbonate, polyurethane, and/or polypropylene.

6. The door of claim 1, wherein door includes at least one recessed handle, wherein, upon being pulled, the at least one recessed handle releases the door, allowing the door to be hingedly rotated with respect to the aerial lift platform.

7. The door of claim 1, further comprising:

one or more standoffs that separate the at least one insulating body of the door and the at least one insulating layer of the aerial lift platform, wherein the at least one fastener includes a first bolt and a second bolt, wherein the one or more standoffs are attached to the at least one insulating body of the door by a first bolt and attached to the at least one insulating layer of the aerial lift platform by a second bolt.

8. A door for an aerial lift platform, comprising:

a first insulating layer covering forming an exterior surface of the door;

a second insulating layer interior to the first insulating layer; and at least one step and/or at least one tooling tray attached to and extending from an interior surface of the door, wherein the door is configured to fit into an opening in a side wall of the aerial lift platform, and wherein the door is configured to attach to at least one insulating layer of the aerial lift platform via at least one fastener one or more standoffs that separate the first insulating layer of the door and the at least one insulating layer of the aerial lift platform, wherein the at least one fastener includes a first bolt and a second bolt, wherein the one or more standoffs are attached to the first insulating layer of the door by a first bolt and attached to the at least one insulating layer of the aerial lift platform by a second bolt.

9. The door of claim 8, wherein the at least one step and/or the at least one tooling tray is attached to the interior surface of the door via at least one attachment fastener.

10. The door of claim 8, wherein the at least one fastener comprises fiberglass-reinforced thermoplastic polyurethane, polycarbonate, polyethylene, polypropylene, and/or at least one fiber-reinforced thermosetting polymer.

11. The door of claim 8, wherein the at least one insulating layer comprises polyethylene.

12. The door of claim 8, wherein door includes at least one recessed handle, wherein, upon being pulled, the at least one recessed handle releases the door, allowing the door to be hingedly rotated with respect to the aerial lift platform.

13. The door of claim 8, wherein an overlap of the at least one insulating layer of the aerial lift platform extends into the opening in the side wall of the aerial lift platform, and wherein, when the door is in a closed position, an interior body of the door directly contacts the overlap of the at least one insulating layer.

14. The door of claim 8, wherein the door further includes at least one air gap.

15. A door for an aerial lift platform, comprising:

a first insulating layer forming an exterior surface of the door;

a second insulating layer interior to the first insulating layer;

wherein the door is configured to fit into an opening in a side wall of the aerial lift platform;

wherein an overlap of at least one insulating layer of the aerial lift platform extends into the opening in the side wall of the aerial lift platform, and wherein, when the door is in a closed position, the second insulating layer of the door directly contacts the overlap of the at least one insulating layer; and wherein the door is configured to attach to at least one insulating layer of the aerial lift platform via at least one fastener.

16. The door of claim 15, wherein at least one step and/or at least one tooling tray is attached to and extends from an interior surface of the door.

17. The door of claim 16, wherein the at least one step and/or the at least one tooling tray is attached to the interior surface of the door via at least one attachment fastener.

18. The door of claim 15, wherein the at least one fastener comprises fiberglass-reinforced thermoplastic polyurethane, polycarbonate, polyethylene, polypropylene, and/or at least one fiber-reinforced thermosetting polymer.

* * * * *